United States Patent
Adam et al.

(10) Patent No.: US 11,245,350 B2
(45) Date of Patent: Feb. 8, 2022

(54) SAFE ELECTRICAL MACHINE

(71) Applicant: SIEMENS MOBILITY GMBH, Munich (DE)

(72) Inventors: Christoph Adam, Nuremberg (DE); Olaf Budig, Erlangen (DE); Hartmut Frank, Rochlitz (DE); Andre Jansen, Borken (DE); Olaf Koerner, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 492 days.

(21) Appl. No.: 16/324,644

(22) PCT Filed: Jun. 26, 2017

(86) PCT No.: PCT/EP2017/065650
§ 371 (c)(1),
(2) Date: Feb. 11, 2019

(87) PCT Pub. No.: WO2018/028867
PCT Pub. Date: Feb. 15, 2018

(65) Prior Publication Data
US 2019/0181790 A1    Jun. 13, 2019

(30) Foreign Application Priority Data
Aug. 9, 2016   (EP) .................................... 16183395

(51) Int. Cl.
*H02P 29/032*    (2016.01)
*H02K 7/00*    (2006.01)
(Continued)

(52) U.S. Cl.
CPC ............ *H02P 29/032* (2016.02); *B60L 13/00* (2013.01); *B60L 15/2009* (2013.01); *B61C 3/00* (2013.01);
(Continued)

(58) Field of Classification Search
CPC ......... H02P 3/04; H02P 29/032; H02K 1/276; H02K 1/278; H02K 7/006; H02K 7/10;
(Continued)

(56) References Cited

U.S. PATENT DOCUMENTS 9,382,899 B2 *   7/2016  Eriksen .................. H02K 7/088
2002/0170786 A1  11/2002  Bucher
(Continued)

FOREIGN PATENT DOCUMENTS

CN        1387298 A     12/2002
CN      203434804 U      2/2014
(Continued)

*Primary Examiner* — Zachary L Kuhfuss
(74) *Attorney, Agent, or Firm* — Laurence A. Greenberg; Werner H. Stemer; Ralph E. Locher

(57) ABSTRACT

An electrical machine has a braking element and a release device. A rotor of the electrical machine includes the braking element and release device. The electrical machine is located, for example, in a rail vehicle. In order to brake the rotor of the electrical machine in the event of an error in the drive train, an overload torque is generated by the electrical machine. An overload clutch is triggered by the overload torque.

17 Claims, 4 Drawing Sheets

(51) Int. Cl.
    *H02K 7/10*     (2006.01)
    *H02K 7/102*     (2006.01)
    *B60L 13/00*     (2006.01)
    *B60L 15/20*     (2006.01)
    *B61C 3/00*     (2006.01)
    *H02P 3/04*     (2006.01)
    *H02K 1/27*     (2006.01)
    *H02K 11/25*     (2016.01)

(52) U.S. Cl.
    CPC .............. *H02K 7/006* (2013.01); *H02K 7/10* (2013.01); *H02K 7/102* (2013.01); *H02K 7/1025* (2013.01); *H02P 3/04* (2013.01); *B60L 2200/26* (2013.01); *H02K 1/276* (2013.01); *H02K 1/278* (2013.01); *H02K 11/25* (2016.01); *H02K 2213/03* (2013.01); *H02K 2213/06* (2013.01)

(58) Field of Classification Search
    CPC ...... H02K 7/102; H02K 7/1025; H02K 11/25; H02K 2213/03; H02K 2213/06; B60L 13/00; B60L 15/20; B60L 15/2009; B60L 2200/26; B61C 3/00; Y02T 10/72
    See application file for complete search history.

(56) References Cited

U.S. PATENT DOCUMENTS

| | | | |
|---|---|---|---|
| 2012/0132489 | A1 | 5/2012 | Adams et al. |
| 2016/0325762 | A1* | 11/2016 | Koerner .................... B61C 3/00 |
| 2018/0262154 | A1* | 9/2018 | Kohler .................. B60L 3/0061 |
| 2019/0036418 | A1* | 1/2019 | Adam ..................... H02K 1/30 |

FOREIGN PATENT DOCUMENTS

| | | |
|---|---|---|
| CN | 203532580 U | 4/2014 |
| DE | 1118339 B | 11/1961 |
| DE | 102013104558 A1 | 11/2014 |
| EP | 2805863 A1 | 11/2014 |
| RU | 66622 U1 | 9/2007 |
| RU | 2544069 C2 | 3/2015 |

* cited by examiner

SAFE ELECTRICAL MACHINE

BACKGROUND OF THE INVENTION

Field of the Invention

An electrical machine, for example, a synchronous machine or an asynchronous machine is used, for example, as a drive motor in a drive train. The drive train serves, for example, for driving a vehicle, wherein the drive train comprises at least the electrical machine. In addition, the drive train can comprise a transmission and/or a coupling. The vehicle is, for example, a road vehicle or a rail vehicle, for example a tram, a locomotive, a power wagon, a suburban railway vehicle or the like. Thus, a rail vehicle or a road vehicle is drivable with the electrical machine.

In a rail vehicle or a road vehicle, there are, for example, one, two or more drive trains. Thus, a plurality of frequency converters and drives, for example, motor-gearbox combinations can be installed in a rail vehicle, in particular. Should a drive or a plurality of drives fail, then remaining drives which have not failed due to a fault for example can be further operated. Part of the drive can also be a power converter, in particular a frequency converter, which can also fail. On failure of individual frequency converters, transmissions or motors, the vehicle can be further operated in a redundancy mode and/or in an emergency mode.

In order to prevent damage to the drive train in the event of a fault, an overload coupling can be provided as in DE 10 2013 104 558 A1 which, in the event of a blockage in the drive train (e.g. due to roller bearing damage), disconnects it from the wheelset.

From DE 1 118 339, there is known an electric motor with a brake disk which is arranged axially displaceably on the motor shaft and which is connected to the motor shaft by means of a coupling with inclined start-up surfaces and which, when the motor is switched on, is pulled toward the armature core. The brake disk is subject to the action of a force storage unit which is preferably arranged between the brake disk and the armature and, with the motor switched off, pushes the brake disk away from the armature and against spring-loaded biased brake pads. Due to the running-on of the motor shaft due to the inertial force of the driven mass, a rotation thereof relative to the brake disk takes place which, in conjunction with the inclined start-up surface of the coupling, increases the brake pressure. The force storage unit is, for example, a helical spring arranged between the brake disk and the armature round the motor shaft or e.g. centrifugal levers which are arranged on the brake disk.

From EP 2 805 863 A1, there is known a drive train for a rail vehicle wagon and a method for recognizing an overload event in a drive train. A drive train is proposed for a rail vehicle wagon comprising a wheelset axle and a gear wheel for transferring a torque from a drive unit to the wheelset axle. An overload coupling with a pre-determined switching torque is connected in a rotationally fixed manner to the wheelset axle and couples the gear wheel in a rotationally fixed manner to the wheelset axle. On exceeding the switching torque, the overload coupling releases the gear wheel relative to the wheelset axle. Through the use of a preferably automatic overload coupling which is arranged on or in the gear wheel of the drive wheelset, during a blockage, for example, of the drive unit of the drive train can be prevented. The drive unit comprises a torque generating device, for example, an electric drive motor and a torque transmission device, for example, a gearbox. The overload coupling separates the drive train of the drive unit and the drive wheelset in an output-side region, i.e. between the wheelset axle and the transmission. If a blockage occurs in the drive train, for example in the transmission, the drive train is interrupted by the overload coupling, which releases the wheelset axle so that no reaction torques can be introduced into the gearbox by the drive wheelset. The drive wheelset works, following release through the overload coupling, as a set of carrying wheels without any torque coupling to the rail vehicle wagon.

SUMMARY OF THE INVENTION

It is an object of the present invention to increase the operational safety of an electrical machine or of a vehicle, in particular a rail vehicle.

A solution to this object is provided by an electrical machine as claimed, by a rail vehicle as claimed and by a method for braking a rotor as claimed. Embodiments of the invention are contained, for example, in the claims.

An electrical machine such as a synchronous machine or an asynchronous machine has a brake element and a release device. The release device serves to release the brake element. By means of the brake element, for example, a frictional force is generated. A rotor of the electrical machine has the brake element and the release device. The synchronous machine is, for example, a permanent magnet-excited synchronous machine, the rotor of which has permanent magnets. The electrical machine comprises, in particular, an overload coupling or is connected thereto.

The overload coupling is actuatable by a release of the brake element. The actuation takes place because a torque arises by means of the released brake element which leads to the actuation of the overload coupling. By means of the release of the brake element, an emergence out of the rotor takes place. Due to the emergence out of the rotor, the brake element enters entirely or partially into the gap between the rotor and the stator. Following the release, the brake element is therefore provided for emergence from the rotor and emerges therefrom. Thus, the brake element can contribute, by friction and/or wedging in relation to the stator and/or the rotor, to the generation of a braking torque. Then, by means of the braking torque, an actuation of the overload coupling takes place when, due to the braking torque, the overload torque is reached.

If, for example, a permanent magnet-excited motor or a plurality of permanent magnet-excited motors is/are used in a vehicle, such as a rail vehicle, or in another drive train and such a motor fails with a winding short-circuit, then this motor is isolated from the frequency converter. Following detection of the winding short-circuit, the faulty motor or the faulty motors is/are no longer fed with external voltage. Without further additional measures, however, the rotor of the faulty motor or the motor no longer attached to the series voltage still continues to rotate. In the case of a rail vehicle, this takes place via the wheel-rail contact by means of which the corresponding rotor is still caused, or can still be caused to rotate by the moving vehicle. This can mean that even if the motor is isolated from the frequency converter which feeds it in normal operation, or is no longer fed by said converter, the defective stator winding (there is, for example, a winding short-circuit) is induced by the permanent magnet rotor. This is brought about by the field rotor flux linkage. The induced voltage drives a fault current via the fault site in the stator. This can lead to arcing and/or high local current heat losses, which can overheat the insulation of the stator winding. This can also lead to the insulation of the stator winding burning and/or its electrically insulating effect becoming lost or reduced. Furthermore, due to the heat generation, melting of the conductor windings in the stator can take place, the conductor windings being made, for example, of copper or a copper alloy. This can also lead toward the outside of the motor, which is an electrical machine, to heating and to slight or relatively severe smoke production, etc.

In an embodiment of the electrical machine, it has a safety coupling. It is an object of the safety coupling, in the event of a fault, to isolate the motor from rotating parts, that is for example, from a wheelset of a rail vehicle, so that the rotor of the motor no longer rotates. It can thus be achieved that no further voltage is induced in the stator winding. By this means, further damage to and/or heating of the motor that is to be stopped, in particular having a winding short-circuit in the stator, is prevented. Thus, the above-described effects can no longer arise.

In an embodiment of the electrical machine, the safety coupling is activated by the brake element whereby the brake element is, for example, a permanent magnet or a soft magnetic element. If the safety coupling is a coupling which releases the coupling above a particular torque, then it is to be achieved with the brake element that the necessary torque is achieved or exceeded so that the safety coupling is actuated and the rotor of the electrical machine becomes separated from parts that continue rotating, as is the case for example, for the wheelset of a rail vehicle. By means of the release device, in the event of a fault, the brake element is to be released so that a braking of the rotor of the electrical machine can take place and thus a torque can be built up by means of which the safety coupling is actuated so that the rotor is released from the drive train.

In an embodiment of the electrical machine, the brake element has an angular cross-section, such as a triangular cross-section or a four or five-sided cross-section. The braking effect can be improved by the corners.

In an embodiment of the electrical machine, the brake element has a round, half-round or oval cross-section. Thereby, it can be achieved that the braking effect or the torque variation is gentler during braking.

In an embodiment of the electrical machine, the release device has a binding band. A brake element is held or a plurality of brake elements are held, for example, in the pole gaps of the permanent magnet rotor with inset magnets, by means of the binding band or the binding bands at each end of the rotor of the electrical machine. For example, a glass fiber binding band and/or a carbon fiber binding band is suitable as the binding band material. In one embodiment, the brake element or the brake elements has/have the same or a similar material behavior as the magnetic metal sheet. A brake element can be configured, for example, laminated, whereby for this, for example, a magnetic metal sheet is used. A brake element can comprise or consist of a soft magnetic composite. Thus, the electromagnetic behavior axially along the rotor length remains at least approximately the same.

A possible material for the binding band is a glass fiber mat or a carbon fiber mat impregnated with a hardening material. The melting temperature of the hardening material is typically between ca. 200° C. and ca. 300° C., in particular between ca. 250° C. and ca. 280° C. The glass transition temperature of the hardening material can lie in this range. Thermoplastics, in particular, are suitable for this. In order to influence the release of the brake element dependent upon the power and/or rotary speed and/or the stator temperature in the event of a fault, hardening materials of different melting points can be used for different machines. The fiber thickness and/or the fiber density of the mat used can also be selected dependent upon the machine so that a reliable actuation can be achieved. The mat can have a woven structure, a fibrous structure and/or a matrix structure. The mat can also be configured as a band.

The binding band can be adapted, with regard to the material used therefor in relation to transition temperatures for the matrix and the fibers of the binding band, to a particular temperature behavior. For example, the clear mechanical property fall-off of the matrix on exceeding the glass transition temperature (thrust-loading region) can be utilized. The property changes of fibers in the binding band can also be used above a relevant temperature range. The relevant temperature range is specified, for example, by the temperature that is expected in the event of a short-circuit. Above this actuating temperature, the strength of the fibers in the binding band can decrease such that in the rotary operation of the machine, a brake element can no longer be held and, for example, enters the air gap. Fibers can comprise a plastics material such as PET, or glass, which changes its properties at higher temperatures and, for example, lessens its tensile strength.

The binding band can also be adapted with regard to the structural configuration. Thus, thrust fields for supporting matrix-dominated mechanical property changes can be provided into the binding band. In a combination with a material selected for the binding band, a thermal expansion of the binding band can be adapted so that, for example, above approximately 200° C., force-fitting is no longer present. This is also influencable through the design principle.

In a further embodiment of the binding band, a sandwich construction can be provided therefor. A decoupling of the mechanism of, for example, two composite layers can take place by means of a softening sandwich core (thermoplastic structures).

The higher the temperature difference is between continuous operation and overload operation of the electrical machine with the stator and the rotor, the more precisely the release device, in particular therefore the binding band, can be set. In an embodiment of the electrical machine, the temperature difference between continuous operation and overload operation is at least 20 Kelvin.

In an embodiment of the electrical machine, the binding band is weakened in the region of the brake element. The mean strength of the binding band in the region of the permanent magnets that are to be held is greater than the mean strength of the binding band in the region of the at least one brake element. Thus, the sensitivity of the release of the brake element can be adjusted without influencing the holding power for the permanent magnets.

When the rotor rotates, centrifugal forces act on the brake element. If a winding short-circuit takes place in the stator, the stator and thus also the rotor, heats up. Due to the heating, the binding band of the rotor which holds the brake element is weakened. The binding band exerts a centripetal force. If the binding band has been weakened such that it can no longer apply the centripetal force, then the braking element becomes released at least partially from the rotor and enters, for example, into the air gap or rubs against a radially outer element such as the stator. The binding band therefore also serves in this case as a release device for the brake element. As a result of the rubbing of the brake element against a radially outer element, a braking torque is produced.

In an embodiment of the electrical machine, it has an overload coupling, whereby the overload coupling is actuated by a release of the brake element. This is the result of the braking torque produced. If the radially outwardly directed braking torque resulting from the brake element exceeds a pre-determined threshold, the overload coupling is actuated and the rotor of the electrical machine becomes separated from other rotating parts such as a wheelset. The overload coupling therefore serves as a safety coupling.

The release device acts as a release mechanism for the safety coupling, which is realized as an overload coupling. This overload coupling is switched by means of an actuating torque which exceeds the operational and sudden short-circuit torques and is thus separated (e.g. the motor from the wheelset). This high blocking/braking torque comes about by means of the at least one brake element emerging from the rotor into the air gap of the machine in the event of a winding short-circuit. Therefore, in the event of a fault (including in vehicles), the safety couplings are actuated internally by the motor itself for uncoupling motors from the drive train. An external actuation, for example, by a digital signal is not necessary. In one embodiment of the electrical machine, the actuation is thermally inducible and concerns, in particular, a winding short-circuit.

A rail vehicle can be equipped with an electrical machine and a wheelset which is drivable by means of the electrical machine, whereby the electrical machine is separable from the wheelset in the event of a fault in the electrical machine. The wheelset can be drivable by means of the electrical machine via a transmission. In order to be able further to ensure the operation of the rail vehicle in the event of a fault, a safety coupling is provided for disconnecting the electrical machine. The actuation can take place by means of a brake element of the type described or by means of other mechanisms. In the event of an error, therefore, in particular, a brake element is provided which emerges from a rotor of the electrical machine into the air gap of the electrical machine.

A road vehicle can be equipped with an electrical machine and at least one electrically drivable wheel, whereby, in the event of a fault in the electrical machine, the electrical machine is separable from the wheel. The wheel can be drivable via a transmission or directly by means of the electrical machine. In the event of a fault, in order to be able further to ensure the operation of the road vehicle, a safety coupling is provided for disconnecting the electrical machine. The actuation can take place by means of a brake element of the type described or by means of other mechanisms.

In the case of rotors with surface magnets which can be held by means of a binding band on the whole rotor surface, with suitable design, this binding band can also act as a release element and the surface magnets can act as brake elements if the binding band delaminates due to the action of heat in the case of a winding short-circuit.

In a method for braking a rotor of an electrical machine for driving a rail vehicle, in the event of a fault in the drive train of the rail vehicle, an overload torque is generated by the electrical machine. By means of this overload torque, for example, a safety device such as a safety coupling is actuated. The safety coupling is, in particular, an overload coupling. Through the generation of the overload torque, in particular, the rotor of the electrical machine is stopped. In order to generate the overload torque, in particular a brake element of the rotor emerges radially from the rotor.

If an overload coupling is actuated by the overload torque, then the actuation is performed by the electrical machine itself. The overload coupling is configured such that it is actuated neither by torques in normal operation nor by sudden short-circuit torques. If, however, the torque exceeds such values and if an actuating torque is reached, then the overload coupling is activated and mechanically disconnects the electrical machine. Thus, a rotor of a permanent magnet motor is disconnectable from the wheelset of a rail vehicle. The actuating torque is selected such that the coupling is actuated by blocking torques and/or braking torques which arise, in particular, due to elements emerging from the rotor into the air gap of the machine in the event of a winding short-circuit.

In an embodiment of the method, in order to generate the overload torque, a brake element of the rotor emerges radially from the rotor and becomes wedged, for example, in the air gap. The brake element emerges, for example, if in the event of a winding short-circuit the fault site in the stator winding of the electrical machine heats the binding band lying in the vicinity so severely that it delaminates and disconnects and/or disintegrates. The elements in the pole gaps move, due to the centrifugal force loading (they are no longer held by the binding band) into the air gap and lead to a blocking of the rotor since the elements become wedged between the rotor and the stator.

In an embodiment of the method, the fault is in the drive train, that is, a winding short-circuit in the stator. Thereby, in a further embodiment for generating the overload torque in the event of a fault, the binding band is delaminated, whereby, during fault-free operation, the binding band holds the brake element. The large braking torque arising then actuates the overload coupling. The rotor then no longer rotates and the motor damaged with a winding short-circuit falls into a safe (static) state. Thus, a thermal and/or mechanical chain of action can be used to recognize a winding short-circuit in the stator and for the actuation of the overload coupling.

The present invention will now be described in greater detail on the basis of embodiments and by reference to the drawings. In the drawings:

DESCRIPTION OF THE INVENTION

Figure 1:
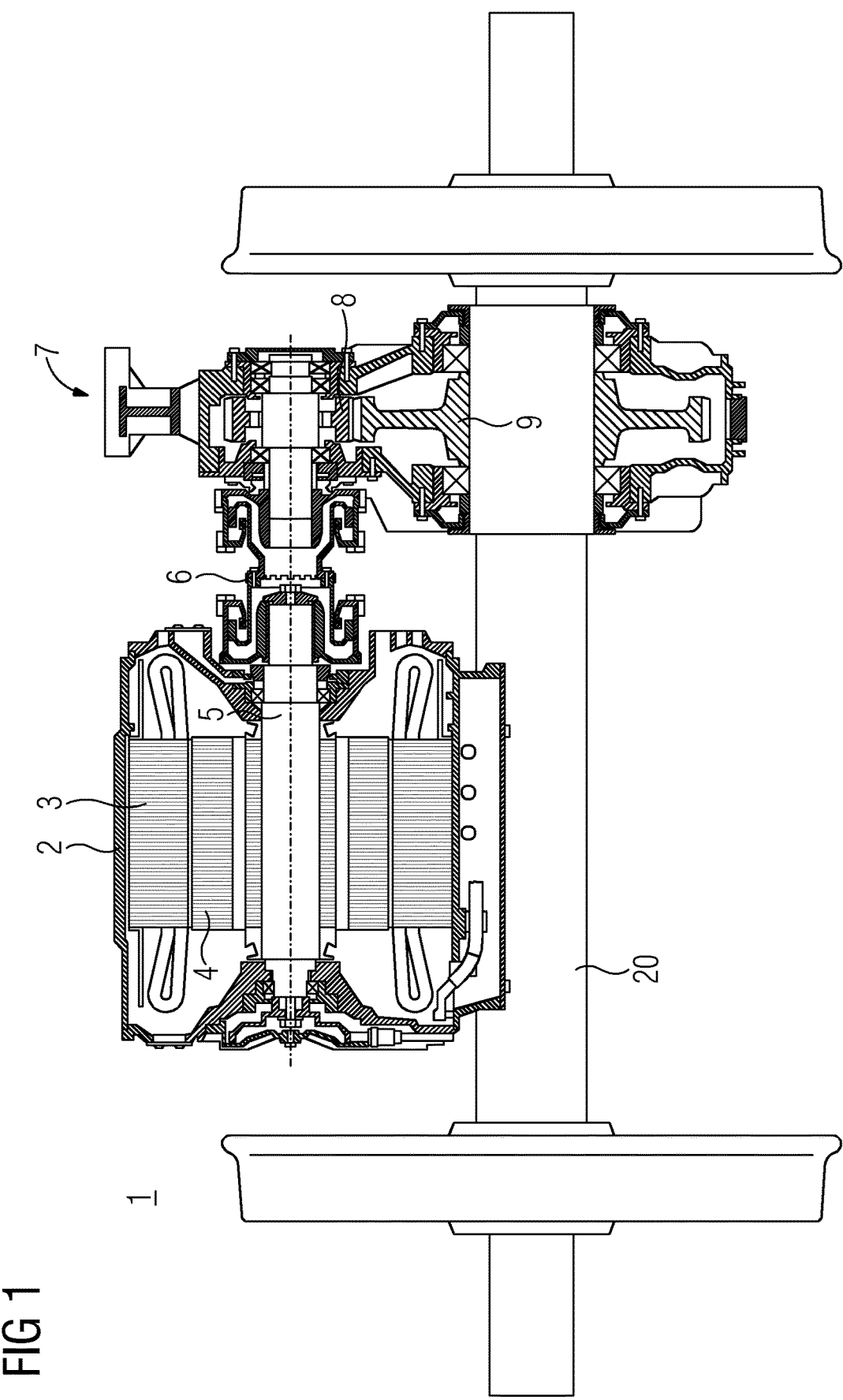
FIG. 1 shows a semi-suspended traction drive for a high-speed train.
Figure 2:
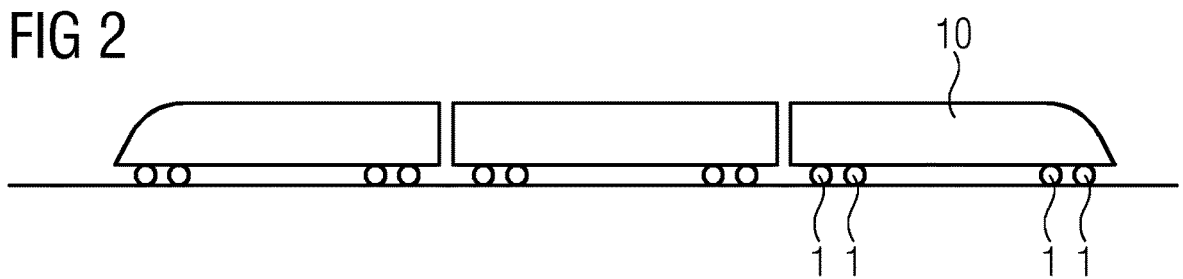
FIG. 2 shows a rail vehicle.

The representation in FIG. 1 shows a wheelset 1 with a traction drive 2 for a high speed train. The traction drive 2 is an electrical machine. The electrical machine 2 comprises a stator 3 and a rotor 4. The rotor 4 is rigidly connected to the motor shaft 5. The motor shaft 5 is mechanically coupled to a transmission 7 by means of a coupling 6. The transmission 7 has a first gearwheel 8 and a second gearwheel 9. The second gearwheel 9 is rigidly connected to the wheelset axle 20. If the electrical machine 2 has a short-circuit in the stator winding, the electrical machine is to be stopped in a simple manner and separated from the wheelset axle. Further wheelsets 1 of a rail vehicle 10 are shown in FIG. 2.

Figure 3:
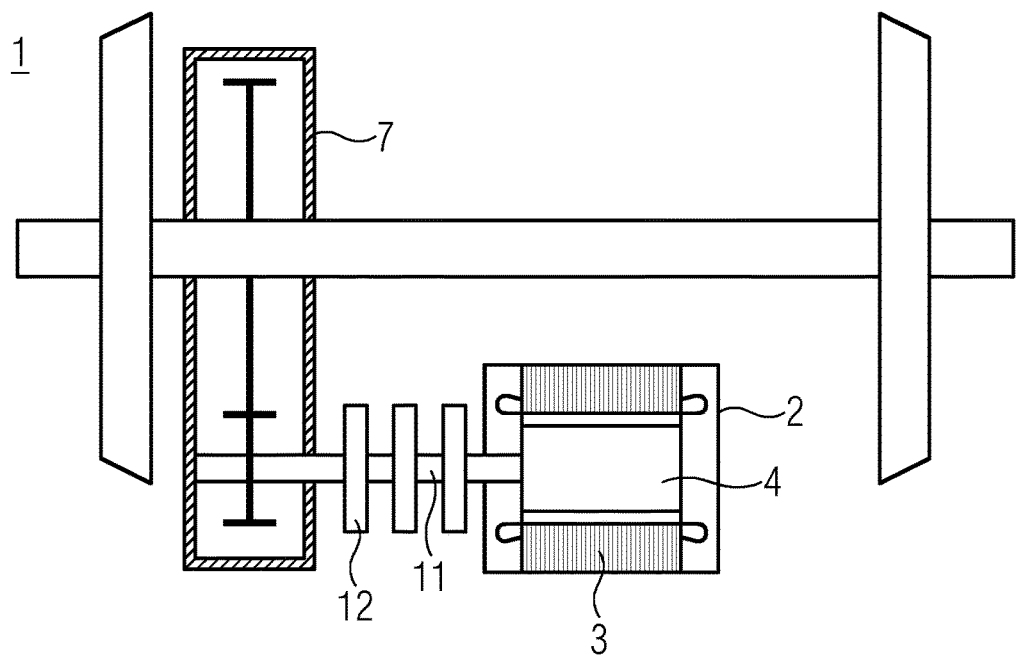
FIG. 3 shows a wheelset with an overload coupling and an electrical machine.

The representation in FIG. 3 shows a wheelset 1 which also has a transmission 7. The electrical machine 2 is coupled to the transmission 7 via a curved tooth coupling 11 and an overload coupling 12. The curved tooth coupling 11 serves to balance movements, in particular during driving operation. The overload coupling serves to separate the transmission 7 and the electrical machine 2 in the event of an overload. In the event of a fault, the overload can be caused by the electrical machine 2 itself.

Figure 4:
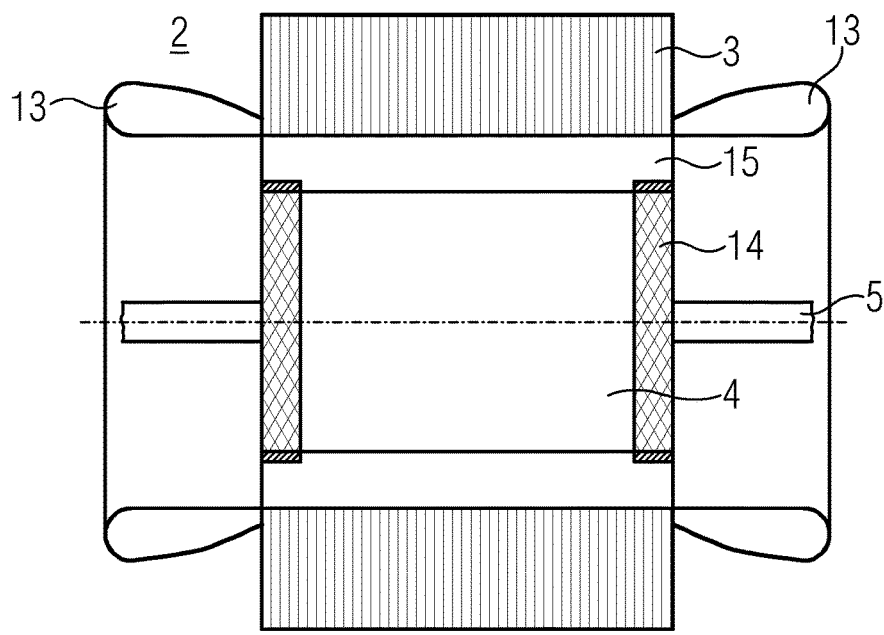
FIG. 4 shows a longitudinal section through the electrical machine.

The representation in FIG. 4 shows the electrical machine 2 in a longitudinal section with its stator 3, the rotor 4 and the air gap 15 therebetween. In this longitudinal section, the winding overhangs 13 of the stator 3 are also shown. The rotor 4 has a binding band 14. It is situated on the end faces of the rotor 4 which is a rotor with permanent magnets 17, as shown in FIG. 5.

Figure 5:
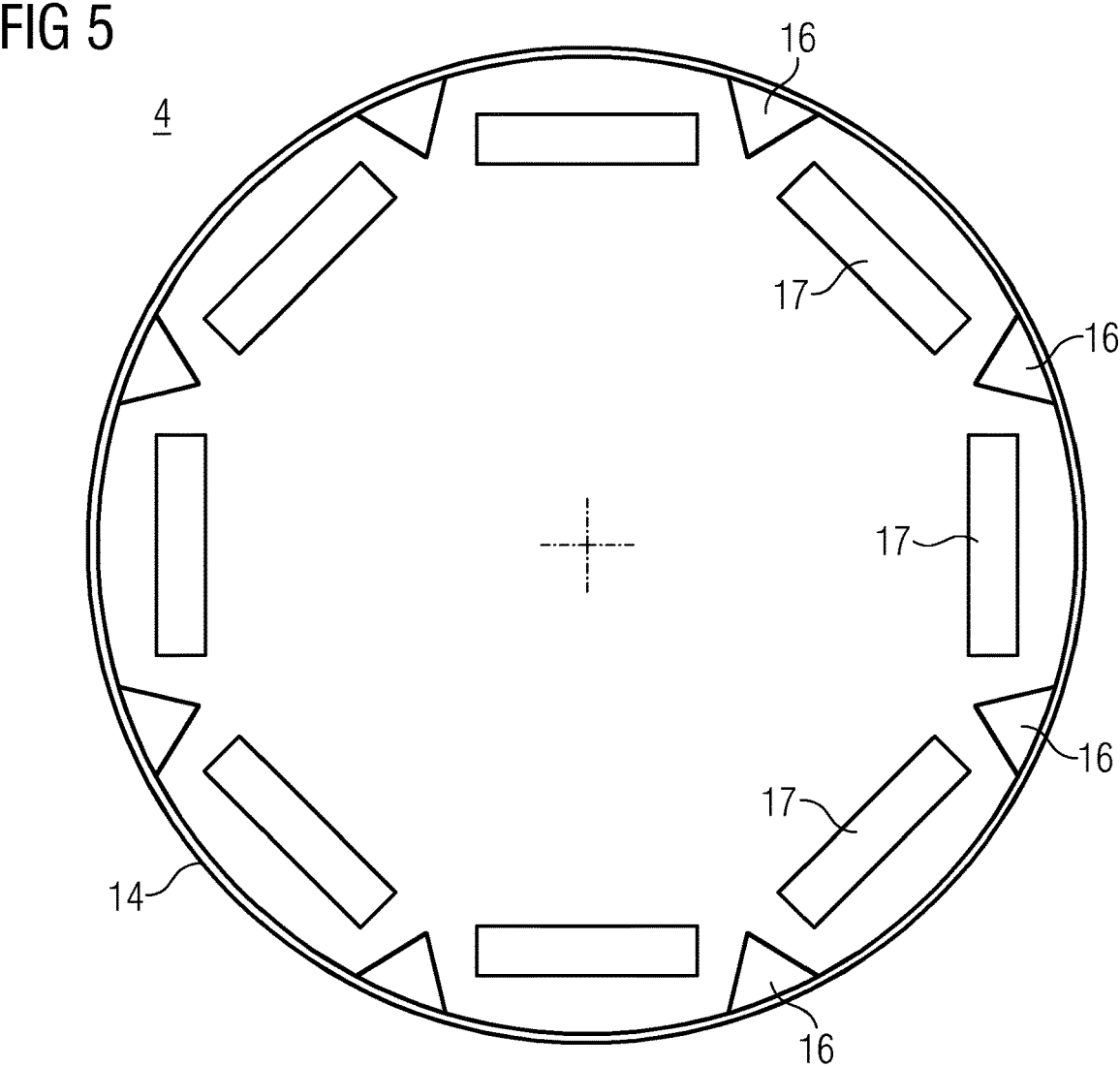
FIG. 5 shows the cross-section of the rotor of the electrical machine.

The representation in FIG. 5 shows the rotor 4 of the electrical machine in cross-section with distributed permanent magnets 17 and brake elements 16. The brake elements 16 are positioned in the peripheral direction between permanent magnets 17.

Figure 6:
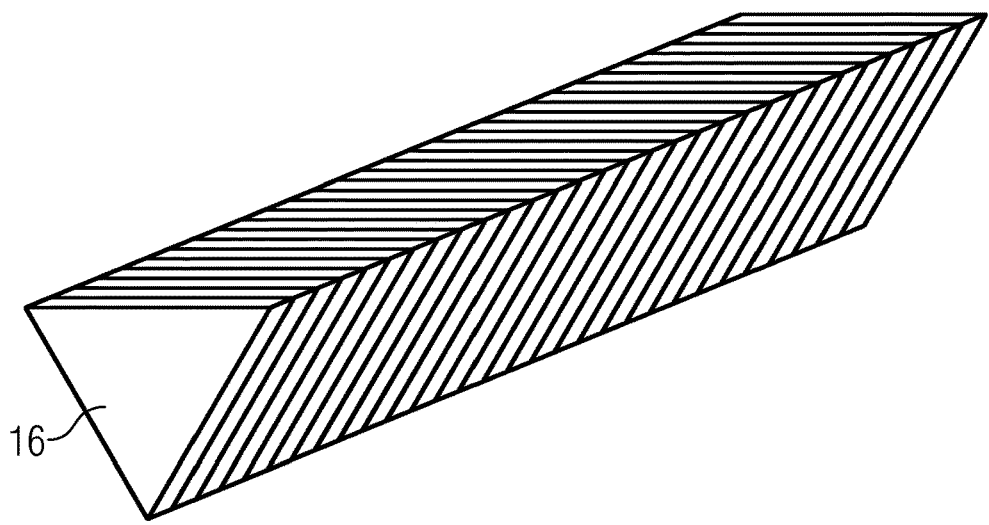
FIG. 6 shows a brake element.

The representation in FIG. 6 shows a brake element 16 in a perspective view. The brake elements 16 are held, as shown in FIG. 5, by means of a binding band 14. If, for example, brake elements 16 are held at the respective ends of the rotor 4 in pole gaps of the permanent rotor 4 with sunken magnets 17 by means of binding bands 14 (e.g. glass or carbon fiber binding bands), then these binding bands 14 can serve as a release device for the brake elements 16. The brake elements 16 are similar, in their material behavior at least, to an electrical sheet steel and are, for example, laminated or made of a soft magnetic composite material. Thus, the electromagnetic behavior axially along the rotor length remains at least approximately the same. In the event of a winding short-circuit in the stator 3, the fault site in the stator winding heats up the binding band 14 lying in the vicinity so severely that it delaminates and disconnects and/or disintegrates. The brake elements 16 in the pole gaps move, due to the centrifugal force loading, into the air gap 15 and lead to a blocking of the rotor 4, since the brake elements 16 become wedged between the rotor 4 and the stator 3. The large braking torque arising then actuates the overload coupling 12 (see FIG. 3). The rotor 4 no longer rotates and the motor 2 damaged with a winding short-circuit falls into the safe state, specifically a standstill. Advantageously, it can also be the case that in the event of other motor blockages, for example, as a result of a bearing damage (the bearing is, for example, the bearing for the rotor 4 of the electrical machine 2, although it is not shown), the overload coupling 12 also acts and a safe state can be created. For rotors with surface magnets (not shown), which are held by a binding band, the solution can also be used. In the variant with sunken magnets in a permanent field synchronous machine, it is also possible that, for improved heat removal from the machine, some radial air channels are arranged in the air gap in the rotor and the stator in order to introduce more cooling air into the air gap (also not shown in the figure). However, the binding bands on the rotor ends partially restrict the air gap cooling air flow. Through the simple and secure separation of a permanent magnet-excited machine 2 as the driving motor from the wheelset in the event of a winding short-circuit by means of an overload coupling 11 by generating a blocking torque without additional sensors and actuators being needed for coupling actuation, the safety of the overall system is enhanced and the operational capability of the rail vehicle is improved. This is achieved, in particular, by means of the overload coupling 12 in the drive train, the brake elements 16, which can also cause blocking and a delamination of the binding band 14, which holds the brake elements 16, through the effect of heat from a winding short-circuit. The brake elements 16 are provided, in particular, in the active part of the electrical machine close to the winding overhangs 13.

Figure 7:
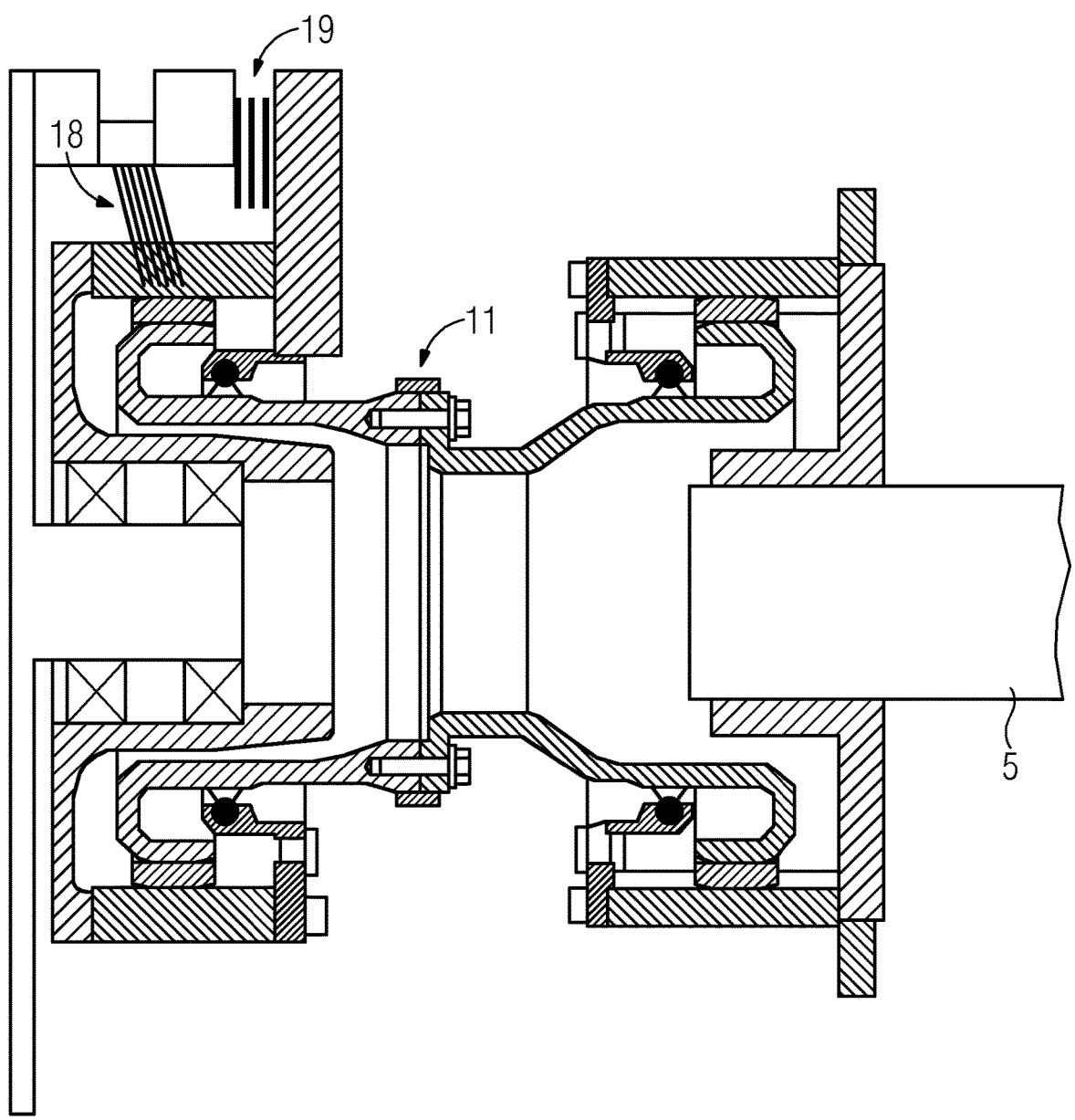
FIG. 7 shows a combination of a ZBG (toothed railway gearbox) coupling with an AKR coupling (a combination of an all-steel coupling and a toothed coupling with actuating plate springs).

The representation in FIG. 7 shows a combination of a ZBG (toothed railway gearbox) coupling with an AKR coupling (a combination of an all-steel coupling and a toothed coupling with actuating plate springs). What is shown is the coupling of the motor shaft 5 via the coupling 11 in conjunction with a plate spring 18 and an annular disk coupling 19 (e.g. ARPEX lamellae, AKR). The adjustment (torque setting) of the plate springs 18 can take place during installation.

The invention claimed is:

1. An electrical machine, comprising:
    a rotor carrying a brake element and a release device;
    an overload coupling configured to be actuated by a release of said brake element, said brake element being configured, upon being released, to emerge radially from said rotor into an air gap of said electrical machine.

2. The electrical machine according to claim 1, wherein said release device is a binding band.

3. The electrical machine according to claim 1, wherein said brake element is a permanent magnet or a soft magnetic element.

4. The electrical machine according to claim 1, wherein an actuation is thermally induced.

5. The electrical machine according to claim 4, wherein the actuation is triggered by a winding short-circuit.

6. A rail vehicle, comprising:
    an electrical machine having a rotor, a stator and an air gap between said rotor and said stator;
    a wheelset to be driven by said electrical machine, wherein the electrical machine is separable from the wheelset in the event of a fault in the electrical machine;
    a brake element disposed to emerge from said rotor, on occasion of a fault, into said air gap of said electrical machine.

7. The rail vehicle according to claim 6, which comprises a transmission between said wheelset and said electrical machine.

8. The rail vehicle according to claim 6, wherein said electrical machine comprises:
    a rotor carrying a brake element and a release device; and
    an overload coupling configured to be actuated by a release of said brake element, said brake element being configured, upon being released, to emerge from said rotor.

9. A method for braking a rotor of an electrical machine for driving a vehicle, the method comprising:
    in the event of a fault in a drive train of the vehicle, causing a brake element carried on a rotor of the electrical machine to emerge radially from the rotor and to thereby generate an overload torque by the electrical machine.

10. The method according to claim 9, wherein the electrical machine drives a rail vehicle or a road vehicle.

11. The method according to claim 9, which comprises stopping the rotor by the overload torque.

12. The method according to claim 9, which comprises actuating an overload coupling with the overload torque.

13. The method according to claim 9, wherein the fault in the drive train is a winding short-circuit in a stator of the electrical machine.

14. The method according to claim 9, which comprises holding the brake element in or on the rotor with a binding band during fault-free operation and, for generating the overload torque in the event of the fault, causing the binding band to become delaminated.

15. The method according to claim 9, which comprises detecting a winding short-circuit in the stator and actuating the overload coupling by employing a mechanical chain of action.

16. The method according to claim 9, which comprises driving the vehicle with an electrical machine that includes:
- a rotor carrying a brake element and a release device; and
- an overload coupling configured to be actuated by a release of the brake element, the brake element being configured, upon being released, to emerge from the rotor.

17. The method according to claim 9, wherein the vehicle is a rail vehicle that includes:
- an electrical machine having a rotor, a stator and an air gap between the rotor and the stator;
- a wheelset to be driven by the electrical machine, wherein the electrical machine is separable from the wheelset in the event of a fault in the electrical machine; and
- a brake element disposed to emerge from the rotor, on occasion of a fault, into the air gap of said electrical machine.

\* \* \* \* \*